United States Patent
Calabrese

(10) Patent No.: US 10,541,731 B2
(45) Date of Patent: *Jan. 21, 2020

(54) SMART TAGS WITH MULTIPLE INTERACTIONS

(71) Applicant: Sony Interactive Entertainment LLC, San Mateo, CA (US)

(72) Inventor: Thomas Calabrese, San Marcos, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/155,546

(22) Filed: Oct. 9, 2018

(65) Prior Publication Data

US 2019/0074868 A1    Mar. 7, 2019

Related U.S. Application Data

(63) Continuation of application No. 15/697,126, filed on Sep. 6, 2017, now Pat. No. 10,128,914.

(51) Int. Cl.
*H04B 5/00* (2006.01)
*H04L 29/08* (2006.01)
*H04L 13/16* (2006.01)

(52) U.S. Cl.
CPC ......... *H04B 5/0062* (2013.01); *H04B 5/0031* (2013.01); *H04L 67/2804* (2013.01); *H04L 13/16* (2013.01)

(58) Field of Classification Search
CPC .. H04B 5/0062; H04B 5/0031; H04B 5/0025; H04B 5/0068; H04W 4/008; H04W 4/023; H04W 4/02; H04W 4/025; H04W 4/026

See application file for complete search history.

(56) References Cited

U.S. PATENT DOCUMENTS

| 3,147,341 A | 9/1964 | Gibson, Jr. |
| 3,200,193 A | 8/1965 | Biggs et al. |

(Continued)

FOREIGN PATENT DOCUMENTS

| CN | 1201180 A | 12/1998 |
| CN | 1385783 A | 12/2002 |

(Continued)

OTHER PUBLICATIONS

Ricadela, A., "Texts Share Tips for Enhancing Play in Popular PC and Console Titles—Books Present Natural Add-On Sales for Games," Computer Retail Week, 8(22), 30 [online], 1998 [retrieved on Jul. 19, 2019], Retrieved from the Internet: <URL:https://dialog.proquest.com/professional/docview/667110627?accountid=142257>, 2 pages.

(Continued)

*Primary Examiner* — Devan A Sandiford
(74) *Attorney, Agent, or Firm* — Carr & Ferrell LLP

(57) ABSTRACT

A method for Near Field Communication (NFC) based interactions can be implemented by a device when it is placed near an NFC tag and receives an electromagnetic signal associated with the NFC tag. The device retrieves the identifier of the NFC tag from the electromagnetic signal and, based on the identifier, the device can generate a first command. Furthermore, the device can identify a qualifying event, such as a predetermined orientation of the device. The device then generates a second command in response to the identification of the qualifying event. Each of the first and second command can cause a change in settings of the device, switching an operating mode of the device, activating/deactivating an application, enabling/disabling a feature of an application, and sending an instruction to a remote electronic device.

20 Claims, 3 Drawing Sheets

(56) References Cited

U.S. PATENT DOCUMENTS

| | | |
|---|---|---|
| 4,016,540 A | 4/1977 | Hyatt |
| 4,090,216 A | 5/1978 | Constable |
| 4,104,625 A | 8/1978 | Bristow et al. |
| 4,355,334 A | 10/1982 | Fitzgibbon et al. |
| 4,445,187 A | 4/1984 | Best |
| 4,475,132 A | 10/1984 | Rodesch |
| 4,514,727 A | 4/1985 | Van Antwerp |
| 4,569,026 A | 2/1986 | Best |
| 4,677,569 A | 6/1987 | Nakano et al. |
| 4,704,696 A | 11/1987 | Reimer et al. |
| 4,752,069 A | 6/1988 | Okada |
| 4,757,525 A | 7/1988 | Matthews et al. |
| 4,952,917 A | 8/1990 | Yabuuchi |
| 5,057,744 A | 10/1991 | Barbier et al. |
| 5,167,010 A | 11/1992 | Elm et al. |
| 5,241,671 A | 8/1993 | Reed et al. |
| 5,274,560 A | 12/1993 | LaRue |
| 5,321,833 A | 6/1994 | Chang et al. |
| 5,358,259 A | 10/1994 | Best |
| 5,377,997 A | 1/1995 | Wilden et al. |
| 5,405,152 A | 4/1995 | Katanics et al. |
| 5,446,714 A | 8/1995 | Yoshio et al. |
| 5,498,002 A | 3/1996 | Gechter |
| RE35,314 E | 8/1996 | Logg |
| 5,598,297 A | 1/1997 | Yamanaka et al. |
| 5,617,407 A | 4/1997 | Bareis |
| 5,649,861 A | 7/1997 | Okano et al. |
| 5,659,732 A | 8/1997 | Kirsch |
| 5,704,837 A | 1/1998 | Iwasaki et al. |
| 5,724,567 A | 3/1998 | Rose et al. |
| 5,732,232 A | 3/1998 | Brush, II et al. |
| 5,765,150 A | 6/1998 | Burrows |
| 5,786,801 A | 7/1998 | Ichise |
| 5,802,361 A | 9/1998 | Wang et al. |
| 5,818,553 A | 10/1998 | Koenck et al. |
| 5,823,879 A | 10/1998 | Goldberg et al. |
| 5,870,740 A | 2/1999 | Rose et al. |
| 5,890,122 A | 3/1999 | Van Kleeck et al. |
| 5,947,823 A | 9/1999 | Nimura |
| 5,948,040 A | 9/1999 | DeLorme et al. |
| 5,974,412 A | 10/1999 | Hazlehurst et al. |
| 5,977,968 A | 11/1999 | Le Blanc |
| 6,001,013 A | 12/1999 | Ota |
| 6,012,053 A | 1/2000 | Pant et al. |
| 6,017,272 A | 1/2000 | Rieder |
| 6,064,978 A | 5/2000 | Gardner et al. |
| 6,067,539 A | 5/2000 | Cohen |
| 6,098,061 A | 8/2000 | Gotoh et al. |
| 6,155,924 A | 12/2000 | Nakagawa et al. |
| 6,168,524 B1 | 1/2001 | Aoki et al. |
| 6,183,366 B1 | 2/2001 | Goldberg et al. |
| 6,202,058 B1 | 3/2001 | Rose et al. |
| 6,210,273 B1 | 4/2001 | Matsuno |
| 6,241,524 B1 | 6/2001 | Aoshima et al. |
| 6,264,560 B1 | 7/2001 | Goldberg et al. |
| 6,273,818 B1 | 8/2001 | Komoto |
| 6,283,861 B1 | 9/2001 | Kawai et al. |
| 6,296,570 B1 | 10/2001 | Miyamoto et al. |
| 6,319,121 B1 | 11/2001 | Yamada et al. |
| 6,327,590 B1 | 12/2001 | Chidlovskii et al. |
| 6,363,378 B1 | 3/2002 | Conklin et al. |
| 6,366,272 B1 | 4/2002 | Rosenberg et al. |
| 6,375,571 B1 | 4/2002 | Ohnuma et al. |
| 6,409,604 B1 | 6/2002 | Matsuno |
| 6,413,163 B1 | 7/2002 | Yamauchi et al. |
| 6,419,580 B1 | 7/2002 | Ito |
| 6,428,411 B1 | 8/2002 | Togami |
| 6,434,556 B1 | 8/2002 | Levin et al. |
| 6,456,977 B1 | 9/2002 | Wang |
| 6,508,706 B2 | 1/2003 | Sitrick et al. |
| 6,529,875 B1 | 3/2003 | Nakajima et al. |
| 6,533,663 B1 | 3/2003 | Iwao et al. |
| 6,538,666 B1 | 3/2003 | Dzawa et al. |
| 6,554,707 B1 | 4/2003 | Sinclair et al. |
| 6,556,983 B1 | 4/2003 | Altschuler et al. |
| 6,571,208 B1 | 5/2003 | Kuhn et al. |
| 6,572,478 B2 | 6/2003 | Miyamoto et al. |
| 6,582,230 B1 | 6/2003 | Aoshima et al. |
| 6,582,309 B2 | 6/2003 | Higurashi et al. |
| 6,585,599 B1 | 7/2003 | Horigami et al. |
| 6,652,384 B2 | 11/2003 | Kondo et al. |
| 6,684,127 B2 | 1/2004 | Fujita et al. |
| 6,705,945 B2 | 3/2004 | Gavin et al. |
| 6,729,954 B2 | 5/2004 | Atsumi et al. |
| 6,826,552 B1 | 11/2004 | Grosser et al. |
| 6,899,628 B2 | 5/2005 | Leen et al. |
| 6,920,426 B2 | 7/2005 | Takechi |
| 6,928,433 B2 | 8/2005 | Goodman et al. |
| 6,935,954 B2 | 8/2005 | Sterchi et al. |
| 6,966,832 B2 | 11/2005 | Leen et al. |
| 6,979,267 B2 | 12/2005 | Leen et al. |
| 7,029,394 B2 | 4/2006 | Leen et al. |
| 7,062,561 B1 | 6/2006 | Reisman |
| 7,085,722 B2 | 8/2006 | Luisi |
| 7,137,891 B2 | 11/2006 | Neveu et al. |
| 7,155,157 B2 | 12/2006 | Kaplan |
| 7,172,118 B2 | 2/2007 | Urken |
| 7,180,529 B2 | 2/2007 | Covannon et al. |
| 7,202,613 B2 | 4/2007 | Morgan et al. |
| 7,233,904 B2 | 6/2007 | Luisi |
| 7,438,642 B2 | 10/2008 | Walker et al. |
| 7,452,273 B2 | 11/2008 | Amaitis et al. |
| 7,455,589 B2 | 11/2008 | Neveu et al. |
| 7,572,187 B2 | 8/2009 | Van Luchene |
| 7,613,616 B2 | 11/2009 | Luisi |
| 7,717,782 B2 | 5/2010 | Van Luchene et al. |
| 7,731,589 B2 | 6/2010 | Kataoka |
| 7,764,026 B2 | 7/2010 | Dowling et al. |
| 7,880,746 B2 | 2/2011 | Marks et al. |
| 7,946,909 B2 | 5/2011 | Neveu et al. |
| 7,965,859 B2 | 6/2011 | Marks |
| 3,295,549 A1 | 10/2012 | Marks et al. |
| 3,442,403 A1 | 5/2013 | Weaver |
| 8,714,983 B2 | 5/2014 | Kil |
| 8,799,250 B1 | 8/2014 | Smith et al. |
| 8,964,298 B2 | 2/2015 | Haddick et al. |
| 9,108,108 B2 * | 8/2015 | Zalewski ............... A63F 13/47 |
| 9,126,116 B2 * | 9/2015 | Turner .................. A63F 13/12 |
| 9,155,960 B2 | 10/2015 | Argiro |
| 9,833,707 B2 * | 12/2017 | Watson ................. A63F 13/52 |
| 9,950,259 B2 * | 4/2018 | Watson ................. A63F 13/52 |
| 10,128,914 B1 | 11/2018 | Calabrese |
| 2001/0009867 A1 | 7/2001 | Sakaguchi et al. |
| 2002/0068626 A1 | 6/2002 | Takeda et al. |
| 2002/0082065 A1 | 6/2002 | Fogel et al. |
| 2002/0103031 A1 | 8/2002 | Neveu et al. |
| 2002/0169617 A1 | 11/2002 | Luisi |
| 2003/0065636 A1 | 4/2003 | Peyrelevade |
| 2003/0109305 A1 | 6/2003 | Gavin et al. |
| 2003/0177347 A1 | 9/2003 | Schneier et al. |
| 2004/0029625 A1 | 2/2004 | Annunziata |
| 2004/0166935 A1 | 8/2004 | Gavin et al. |
| 2005/0054290 A1* | 3/2005 | Logan .................... G06F 3/002 |
| | | 455/41.2 |
| 2005/0170828 A1* | 8/2005 | Nakamura ........ H04M 1/72563 |
| | | 455/419 |
| 2005/0174889 A1 | 8/2005 | Marcantonio et al. |
| 2005/0191969 A1* | 9/2005 | Mousseau ........... H04M 1/6505 |
| | | 455/90.2 |
| 2005/0275508 A1* | 12/2005 | Orr ......................... G08B 6/00 |
| | | 340/407.1 |
| 2006/0039017 A1 | 2/2006 | Park et al. |
| 2006/0178179 A1 | 8/2006 | Neveu et al. |
| 2006/0190270 A1 | 8/2006 | Luisi |
| 2007/0037605 A1* | 2/2007 | Logan ................ G08B 13/1427 |
| | | 455/567 |
| 2007/0060231 A1 | 3/2007 | Neveu |
| 2007/0087797 A1 | 4/2007 | Van Luchene |
| 2007/0099709 A1 | 5/2007 | Okada |
| 2007/0244704 A1 | 10/2007 | Luisi |
| 2007/0257928 A1 | 11/2007 | Marks et al. |
| 2007/0279427 A1 | 12/2007 | Marks |
| 2008/0064019 A1 | 3/2008 | Kaufman |
| 2008/0109491 A1 | 5/2008 | Gupta |

(56) References Cited

U.S. PATENT DOCUMENTS

| | | | |
|---|---|---|---|
| 2008/0167106 | A1* | 7/2008 | Lutnick .................. G07F 17/32 463/16 |
| 2008/0220869 | A1 | 9/2008 | Midgley et al. |
| 2009/0054814 | A1* | 2/2009 | Schnapp ............... A61B 5/1116 600/595 |
| 2009/0063463 | A1 | 3/2009 | Turner |
| 2009/0119234 | A1 | 5/2009 | Pinckney et al. |
| 2010/0041475 | A1 | 2/2010 | Zalewski et al. |
| 2010/0111374 | A1 | 5/2010 | Stoica |
| 2010/0138764 | A1 | 6/2010 | Hatambeiki et al. |
| 2010/0171430 | A1 | 7/2010 | Seydoux |
| 2010/0213873 | A1 | 8/2010 | Picard et al. |
| 2010/0241496 | A1* | 9/2010 | Gupta .................... G06Q 30/02 705/14.1 |
| 2010/0312366 | A1 | 12/2010 | Madonna et al. |
| 2013/0344960 | A1 | 12/2013 | Perry et al. |
| 2014/0121009 | A1 | 5/2014 | Watson |
| 2014/0132628 | A1 | 5/2014 | Hoff, III |
| 2014/0135631 | A1* | 5/2014 | Brumback ......... A61B 5/02438 600/479 |
| 2014/0142403 | A1* | 5/2014 | Brumback ......... A61B 5/02433 600/324 |
| 2014/0191848 | A1* | 7/2014 | Imes .................... H04B 5/0037 340/10.5 |
| 2014/0329613 | A1* | 11/2014 | Savarese ............ G06K 7/10366 473/222 |
| 2014/0361872 | A1* | 12/2014 | Garcia ................. H04B 5/0062 340/5.74 |
| 2015/0141005 | A1* | 5/2015 | Suryavanshi ......... H04L 67/125 455/434 |
| 2015/0304804 | A1* | 10/2015 | Lotito .................... G06F 3/017 455/41.1 |
| 2015/0347738 | A1* | 12/2015 | Ulrich .................... G06F 21/34 726/17 |
| 2016/0018934 | A1 | 1/2016 | Turner et al. |
| 2016/0057565 | A1* | 2/2016 | Gold .................... H04W 4/008 455/41.1 |
| 2016/0282899 | A1* | 9/2016 | Inagaki .................. G04G 9/04 |
| 2017/0368459 | A1 | 12/2017 | Watson |
| 2018/0091193 | A1* | 3/2018 | Hagedorn ............... H04W 4/80 |
| 2018/0326304 | A1 | 11/2018 | Daniel |

FOREIGN PATENT DOCUMENTS

| | | |
|---|---|---|
| CN | 1848742 A | 10/2006 |
| CN | 101836362 A | 9/2010 |
| CN | 101849436 A | 9/2010 |
| CN | 101968827 A | 2/2011 |
| CN | 101968827 B | 5/2014 |
| CN | 104797311 A | 7/2015 |
| CN | 104797311 B | 9/2018 |
| DE | 19905076 A1 | 6/2002 |
| EP | 0789296 A1 | 8/1997 |
| EP | 0850673 A1 | 7/1998 |
| EP | 0898237 A2 | 2/1999 |
| EP | 0901803 A1 | 3/1999 |
| EP | 0913175 A2 | 5/1999 |
| EP | 1029569 A2 | 8/2000 |
| EP | 1078661 A1 | 2/2001 |
| EP | 1262955 A2 | 12/2002 |
| EP | 1355707 A1 | 10/2003 |
| EP | 1388357 A2 | 2/2004 |
| EP | 1434627 A1 | 7/2004 |
| EP | 1630754 A1 | 3/2006 |
| EP | 1650706 A1 | 4/2006 |
| EP | 1793588 A1 | 6/2007 |
| EP | 1262955 B1 | 3/2010 |
| EP | 2322257 A2 | 5/2011 |
| EP | 2322257 B1 | 4/2018 |
| GB | 2355627 A | 9/1998 |
| GB | 2351637 A | 1/2001 |
| GB | 2356785 A | 5/2001 |
| GB | 2411065 A | 8/2005 |
| JP | 1PS59202779 A | 11/1984 |
| JP | H07178246 A | 7/1995 |
| JP | H08155140 A | 6/1996 |
| JP | H09265379 A | 10/1997 |
| JP | H10272258 A | 10/1998 |
| JP | H10295935 A | 11/1998 |
| JP | H11000467 A | 1/1999 |
| JP | H11070273 A | 3/1999 |
| JP | H11119791 A | 4/1999 |
| JP | H11197359 A | 7/1999 |
| JP | 2000024322 A | 1/2000 |
| JP | 2000116946 A | 4/2000 |
| JP | 2000176154 A | 6/2000 |
| JP | 2000334168 A | 12/2000 |
| JP | 2001009156 A | 1/2001 |
| JP | 2001029649 A | 2/2001 |
| JP | 2001079265 A | 3/2001 |
| JP | 2001157779 A | 6/2001 |
| JP | 2001198350 A | 7/2001 |
| JP | 2002052256 A | 2/2002 |
| JP | 2002085835 A | 3/2002 |
| JP | 2002092474 A | 3/2002 |
| JP | 2002159740 A | 6/2002 |
| JP | 2002166048 A | 6/2002 |
| JP | 2002191868 A | 7/2002 |
| JP | 2003047768 A | 2/2003 |
| JP | 2003228585 A | 8/2003 |
| JP | 2004529678 A | 9/2004 |
| JP | 2005505357 A | 2/2005 |
| JP | 3741687 B2 | 2/2006 |
| JP | 2006031670 A | 2/2006 |
| JP | 2006087459 A | 4/2006 |
| JP | 2006099125 A | 4/2006 |
| JP | 3865721 B2 | 1/2007 |
| JP | 2007249899 A | 9/2007 |
| JP | 2011025044 A | 2/2011 |
| JP | 5580131 B2 | 8/2014 |
| KR | 1020000072753 A | 12/2000 |
| KR | 100464877 B1 | 12/2004 |
| KR | 100469822 B1 | 1/2005 |
| KR | 1020020044919 A | 6/2005 |
| KR | 1020070052493 A | 8/2008 |
| KR | 101226305 B1 | 1/2013 |
| WO | WO1994018790 A1 | 8/1994 |
| WO | WO9714102 A1 | 4/1997 |
| WO | WO2001082626 A1 | 11/2001 |
| WO | WO2002060548 A2 | 8/2002 |
| WO | WO2003031003 A1 | 4/2003 |
| WO | WO2005040900 A1 | 5/2005 |
| WO | WO2006033360 A1 | 3/2006 |
| WO | WO2007130641 A2 | 11/2007 |
| WO | WO2009052659 A1 | 4/2009 |
| WO | WO2009060376 A1 | 5/2009 |
| WO | WO2014070677 A2 | 5/2014 |

OTHER PUBLICATIONS

"Notice of Allowance", Chinese Patent Application No. 201380056819. 3, dated Jun. 8, 2018, 2 pages [4 pages including Translation].

"International Search Report" and "Written Opinion of the International Searching Authority," Patent Cooperation Treaty Application No. PCT/US2018/047694, dated Sep. 21, 2018, 12 pages.

Ohashi et al. "A Gesture Recognition Method for a Stick Input System. " Transactions of the Information Processing Society of Japan 40, No. 2 (1999) [retrieved on Mar. 19, 2014]. Retrieved from the Internet: <URL: http://ci.nii.ac.jp/naid/110002764810>. 12 pages.

Dorsey et al., Design and Simulation of Opera Lighting and Projection Effects, Program of Computer Graphics, computer Graphics, Jul. 1991, vol. 25, No. 4, New York, pp. 41-50.

Nayer et al, Lighting Sensitivity Display, ACM Transactions on Graphics, Oct. 2004, vol. 23, No. 4, pp. 963-979, New York, pp. 963-979.

Spagnoletti, Philips Ambilight TV, Home Entertainment, engadget, Jul. 8, 2004, 1 page.

European Search Report, dated Jan. 19, 2004, European Patent Application No. 02009339.9, 2 pages.

(56) References Cited

OTHER PUBLICATIONS

"Office Action", European Patent Application No. 02009339.9, dated Jan. 19, 2006, 5 pages.
"Office Action", European Patent Application No. 02009339.9, dated Dec. 11, 2006, 3 pages.
"Office Action", European Patent Application No. 02009339.9, dated Jul. 4, 2007, 4 pages.
"Office Action", European Patent Application No. 02009339.9, dated Sep. 17, 2008, 4 pages.
"Notice of Allowance", European Patent Application No. 02009339.9, dated Nov. 16, 2009, 33 pages.
"International Search Report", Patent Cooperation Treaty Application No. PCT/US02/32438, dated Feb. 4, 2013, 1 page.
"International Search Report" Patent Cooperation Treaty Application No. PCT/US2007/010944, dated Feb. 18, 2008, 5 pages.
"Search Report", European Application No. 02769043.7, dated Dec. 21, 2004, 4 pages.
"Office Action", European Patent Application No. 02769043.7, dated Apr. 28, 2005, 6 pages.
"Office Action", European Patent Application No. 02769043.7, dated Oct. 24, 2006, 5 pages.
"Office Action", European Patent Application No. 02769043.7, dated Jan. 31, 2007, 3 pages.
"International Search Report" Patent Cooperation Treaty Application No. PCT/US02/02710, dated Sep. 12, 2002, 3 pages.
"Office Action", European Patent Application No. 02704295.1, dated Apr. 23, 2004, 3 pages.
"Office Action", European Patent Application No. 02704295.1, dated Dec. 15, 2004, 4 pages.
"Office Action", European Patent Application No. 02704295.1, dated Dec. 13, 2005, 4 pages.
"Office Action", European Patent Application No. 02704295.1, dated Apr. 12, 2006, 10 pages.
"Office Action", China Patent Application No. 201010245413.8, dated Sep. 7, 2012, 3 pages [11 pages with translation].
"Office Action", China Patent Application No. 201010245413.8, dated Apr. 1, 2013, 6 pages [16 pages with translation].
"Office Action", European Patent Application No. 10007803.9, dated Aug. 8, 2013, 6 pages.
"Office Action", Japan Patent Application No. 2010-167803, dated Mar. 26, 2013, 3 pages [6 pages with translation].
Office Action, Korea Patent Application No. 10-2010-0072613, dated Mar. 16, 2012 in.
"International Search Report & Written Opinion", Patent Cooperation Treaty Application No. PCT/US2013/067135, dated May 1, 2014, 18 pages.
Rejection dated Mar. 2, 2004 in KR Application No. 10-2002-00265621.
Notice of Allowance dated Oct. 11, 2005 in Japan Application 2002-560737.
"Office Action", Japan Application 2002-5607373, dated Nov. 24, 2004.
"Office Action", China Patent Application No. 201010245413.8, dated Nov. 5, 2013, 4 pages [12 pages with translation].
"European Search Report", European Patent Application No. 03254168.2, dated Apr. 23, 2004, 3 pages.
"Office Action", European Patent Application No. 03254168.2, dated Sep. 29, 2006, 4 pages.
Stern, Andrew. Virtual Babyz: Believeable agents with Narrative Intelligence, Narrative Intelligence AAAI Symposium, Nov. 1999. Online. Viewed Apr. 28, 2006. http://www.cs.cmu.edu/afs/cs/user/michaelm/www/nidocs/Stem.html, 7 pages.
"Babyz Features Page." Online. Viewed May 3, 2006. www.babyz.net/features.html, 1 page.
"Babyz". Wikipedia online reference. Viewed May 1, 2006. http://en.wikipedia.or.q/wiki/babyz, 2 pages.
Northwestern University CS395, Game Design Course "Simulation and Modeling: Under the Hood of the Sims", Spring 2002. http://www.cs.northwestern.edu/%7Eforbus/c95-gd/lectures/The_Sims_Under_the_Hood_files/frame.htm, 32 pages.
Simpson, Dan. "The Complete Sims Guide" Feb. 6, 2005, pertinent sections printed from the Internet, may also be found in its entirety at http://www.neoseeker.com/resourcelink.html?rlid=16238&rid=15516, 18 pages.
"Sequence Paradium 2—Laughter in the Dark—Tactical Guidebook", First Edition, Keibunsha Inc., Feb. 10, 2005, pp. 5-32.
Sprigg, Sean M., Patent Examiner, Examiner's Affidavit, dated Nov. 9, 2005, 5 pages.
Stern, Andrew. "Andrew Stem". Online. Viewed Apr. 28, 2006. http://quvu.net/andrew/resume.html, 6 pages.
Stewart, Nick. "The Adrenaline Vault Review of The Sims", Mar. 9, 2000. Printed from the Internet, 5 pages.
Notice of Allowance dated Jun. 10, 2014 in Japan Application 2010-167803.
"Office Action", Japan Patent Application No. 2003-288128, dated Mar. 15, 2005.
"Office Action", Japan Patent Application No. 2003-288128, dated Dec. 13, 2005.
Notice of Allowance dated Oct. 31, 2012 in KR 10-2010-0072613 (3 pages including English Translation).
"Office Action", European Patent Application No. 10007803.9, dated Sep. 29, 2014, 4 pages.
"Office Action", China Patent Application No. 201380056819.3, dated Nov. 15, 2016, 6 pages [16 pages including translation].
"Office Action," Chinese Patent Application No. 201380056819.3, dated Jun. 23, 2017, 3 pages [7 pages including ranslation].
"Notice of Allowance", European Patent Application No. 10007803.9, dated Oct. 23, 2017, 7 pages.
"Office Action", Chinese Patent Application No. 201380056819.3, dated Dec. 18, 2017, 3 pages [7 pages including Tanslation].

\* cited by examiner

SMART TAGS WITH MULTIPLE INTERACTIONS

CROSS REFERENCE TO RELATED APPLICATIONS

The present application is a continuation of U.S. patent application Ser. No. 15/697,126, filed on Sep. 6, 2017 and titled "Smart Tags with Multiple Interactions," which is hereby incorporated by reference herein in its entirety, including all references and appendices cited therein.

BACKGROUND

Technical Field

This disclosure generally relates to interactions of Near Field Communication (NFC) tags with devices (e.g., mobile devices). More particularly, this disclosure relates to devices and method for NFC-based interactions that involve generating one or more commands by the devices based on detecting one or more NFC tags by the devices and determining one or more qualifying events by the devices.

Description of Related Art

The use of NFC tags, such as those that interact with smartphones, have become common in many aspects of human life as they enhance the functionality of a device (e.g., a mobile device). For example, NFC tags can be used to gain access to a building, grant an entitlement, direct a user to a website, make a payment, open an application, etc. An NFC tag is typically write protected and includes unique information that determines the action performed when a mobile device or reader interacts with the tag. Devices will typically read an NFC tag once and perform one action, limiting the functionality of the NFC tag. In addition, NFC chips are being built into an increasing number of devices and can also be implanted into individuals. Thus, improvements to interactions with NFC tags and NFC chips are needed.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. The following concepts and aspect of the disclosure are designed to solve at least some drawbacks known in the art. The discussion of devices include mobile devices, and the discussion of applications include mobile applications.

In one embodiment of this disclosure, there is provided a method for NFC-based interactions. The method can comprise receiving, by a device, an electromagnetic signal of a NFC tag when the device is within a first predetermined distance from the NFC tag, retrieving, by the device, an identifier of the NFC tag from the electromagnetic signal of the NFC tag, and, based on the identifier, generating, by the device, a first command, wherein the first command is configured to cause performing one or more of the following: change at least one setting of the device, switch at least one of operating modes of the device, activate at least one application, deactivate at least one application, enable at least one feature of at least one application, disable at least one feature of at least one application, and send a first instruction to at least remote electronic device.

The method can further include identifying, by the device, a qualifying event before or after the first command is generated, and, based on the identification of the qualifying event, generating, by the device, a second command, wherein the second command is generated after the first command, and wherein the second command is configured to cause performing one or more of the following: change at least one of the settings of the device, switch at least one of the operating modes of the device, activate at least one of the applications, deactivate at least one of the applications, enable at least one feature of at least one of the applications, disable at least one feature of at least one of the applications, and send a second instruction to at least one of the remote electronic devices.

In certain embodiments, the method may further comprise suppressing, by the device, the generation or use of the first command when the qualifying event is identified. In some embodiments, the identification of the qualifying event includes determining, by the device, that the device is located within the first predetermined distance from the NFC tag for a predetermined period. In other embodiments, the identification of the qualifying event can include determining, by the device, that the device is orientated substantially upside down such that a display of the device is substantially parallel to the ground and faces the ground.

In yet other embodiments, the identification of the qualifying event can include determining, by the device, that the device is locked. In yet other embodiments, the identification of the qualifying event can include determining, by the device, that the device is unlocked. In yet other embodiments, the identification of the qualifying event can include determining, by the device, that the device is located within a second predetermined distance from a predetermined geographical location associated with the identifier of the NFC tag.

In certain embodiments, the method may further comprise providing, by the device, a first notification to a user when the first command is generated or to be generated by the device. In certain embodiments, the method may further comprise providing, by the device, a second notification to the user when the second command is generated or about to be generated by the device. Moreover, in some embodiments, the first notification is a vibrational notification generated by the device, and the second notification is a doubled vibrational notification generated by the device.

In another aspect of this disclosure, there is provided a device. The device comprises an NFC communication module configured to wirelessly communicate with one or more NFC tags, a processor, and a memory storing processor-executable codes. The processor can be configured to implement the following operations upon executing the processor-executable codes stored by the memory: cause reading of an electromagnetic signal of one of the NFC tags when the device is within a first predetermined distance from the NFC tag, cause retrieving an identifier of the NFC tag from the electromagnetic signal of the NFC tag, based on the identifier, cause generating a first command, wherein the first command is configured to cause performing one or more of the following: change at least one setting of the device, switch at least one of operating modes of the device, activate at least one of applications, deactivate at least one of the applications, enable at least one feature of at least one of the applications, disable at least one feature of at least one of the applications, and send a first instruction to at least one of remote electronic devices; cause identifying a qualifying event before or after the first command is generated; and, based on the identification of the qualifying event, cause generating a second command, wherein the second command is generated after the first command, and wherein the second command is configured to cause performing one or more of the following: change at least one of the settings of the device, switch at least one of the operating modes of the device, activate at least one of the applications, deactivate at least one of the applications, enable at least one feature of at least one of the applications, disable at least one feature of at least one of the applications, and send a second instruction to at least one of the remote electronic devices.

In other embodiments, an NFC chip can be on the person, as an adhesive or wearable device. An NFC chip can be implanted within a person. An NFC tag can also be used to control certain actions within a video game, depending on the location of a controller relative to the user with the NFC tag, as well as on the manner in which the controller is being handled by the user.

In another embodiment, the implanted or wearable NFC chip can be used as an authentication device for a laptop, a device, a door lock, or a portable lock such as one for a bicycle or locker, in combination with a series of interactions that can be used to enforce dual factor authentication.

In yet another aspect of the disclosure, there is provided a non-transitory processor-readable medium having instructions stored thereon, which when executed by one or more processors, cause the one or more processors to implement the above-outlined method for NFC-based interaction.

Additional objects, advantages, and novel features of the examples will be set forth in part in the description, which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

Figure 1:
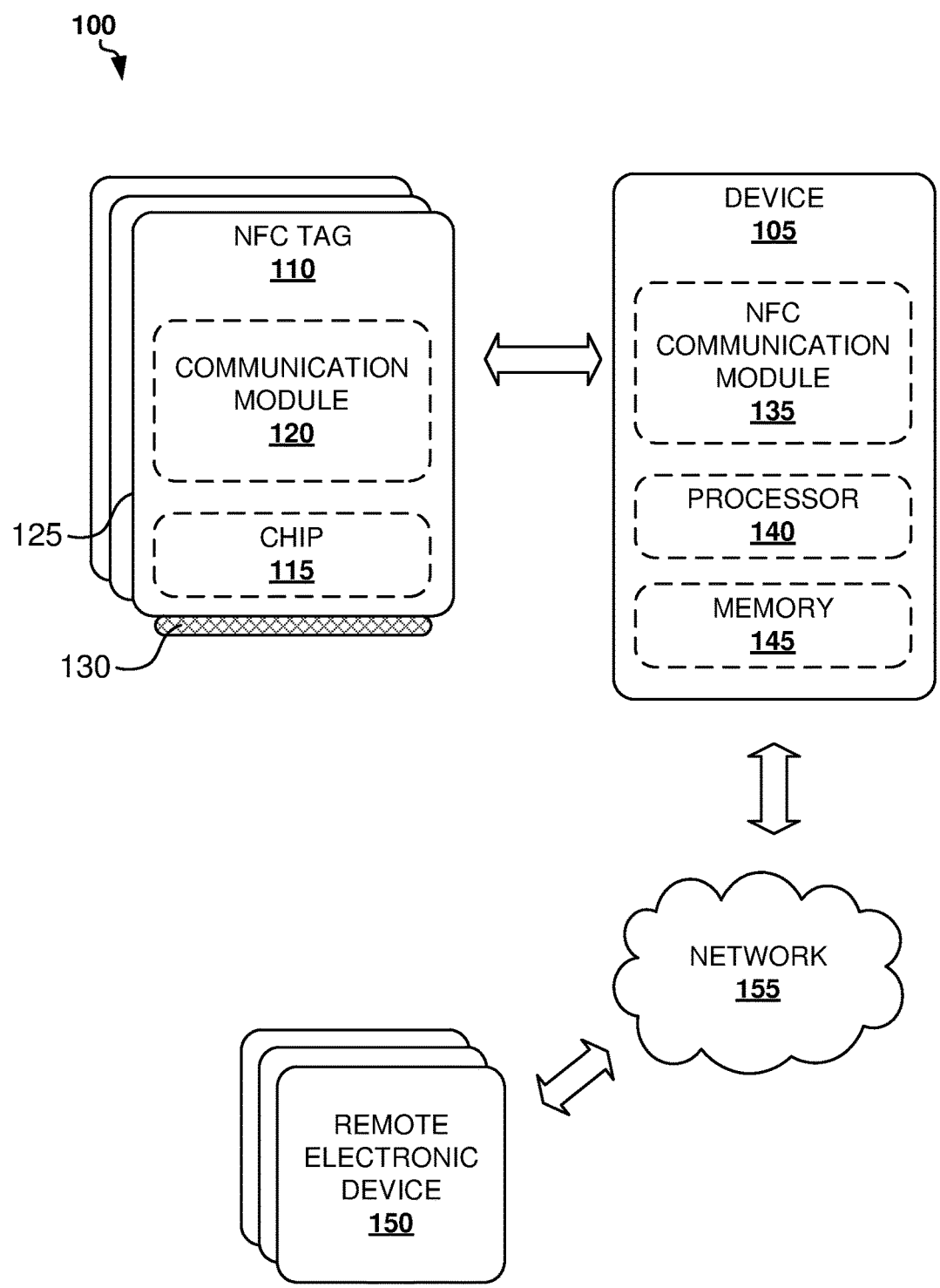
FIG. 1 shows a block diagram illustrating a system for providing NFC-based interactions.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or necessary in a commercially feasible embodiment are often not depicted in order to facilitate a less obstructed view of these various embodiments of the present disclosure.

DETAILED DESCRIPTION OF EXAMPLE EMBODIMENTS

The present disclosure generally relates to systems and methods for providing or improving interaction with a device based on NFC tags. NFC tags can be also referred to as "smart tags" or Radio-Frequency Identification (RFID) tags, and the like. NFC tags can be implemented as stickers, key fobs, or in any other similar manner so that they can be fixed, mounted, connected, or otherwise coupled to certain items indoors or outdoors. For example, NFC stickers can be placed near a bed, on a kitchen table, door, inside vehicle, and the like. A device includes mobile devices, and an application includes mobile applications.

To interact with NFC tags, a user can use a device, such as a smartphone, which has a NFC communication module configured to wirelessly communicate with one or more NFC tags when the device is in a vicinity of NFC tags (e.g., at a distance less than about 2 inches). Each NFC tag can be uniquely identified as it bears a unique identifier. When the device reads an electromagnetic signal generated by the NFC tag, the device can detect or retrieve the unique identifier of the NFC tag. Furthermore, as a response to the identification of the unique identifier of the NFC tag, the device can perform pre-programmed operations associated with the unique identifier. The pre-programmed operations can cause a change in settings of the device, cause switching between operating modes of the device, cause activating/deactivating of an application, cause enabling/disabling a feature of the application, or cause sending an instruction to a remote electronic device. For example, placing the device in a vicinity of one of the NFC tags coupled to a couch, could activate a remote control application on the device to enable a remote control application to control a television (TV) device by the user. In another example, placing the device close to another NFC tag attached to a refrigerator can activate a tracking feature of the device or application to track amount of water that the user drinks.

Each NFC tag includes a passively emitting device not requiring electrical power as it emits signals in response to a wireless signal received from the device. In some example embodiments, the longest side of the NFC tag can be, optionally, of about one inch or less. NFC tags can be of different colors such as white, black, red, blue, green, yellow, metallic, transparent, and so forth. Furthermore, each tag can include a chip and a communication module having a coil or an antenna. The chip can be configured to cause the communication module to emit a certain electromagnetic signal bearing a unique identifier of an NFC tag, for example, as a response to a received signal from a device. Each NFC tag can include an adhesive layer so that it can be used as a sticker. Moreover, users can secure NFC tags with magnets, pins, or clips so that they can be easily transportable from one location to another.

The device can be programmed before it can interact with NFC tags. To these ends, after placing the NFC tag at a desired location, the user can open a certain application and place the device near the NFC tag. The user would need to pre-program and indicate what actions or operations the device is to perform upon sensing the electromagnetic signal bearing the unique identifier of the NFC tag. For example, the user can set up IFTTT (If This Then That) commands to be executed upon sensing the electromagnetic signal bearing the unique identifier of the NFC tag. The user can also set up the device such that the presence of the NFC tag would open and perform actions by one or more specific applications of the device. Moreover, two or more actions can be available for every NFC tag. For example, a first action can initiate with a tap or placement of the device in a vicinity of an NFC tag. The device can send a notification such as a vibrational notification when the first action is successfully initiated or completed or about to be initiated.

Furthermore, upon detection of certain qualifying event, a second action can be initiated by the device. For instance, if the user holds the device over the NFC tag after the first notification for a predetermined period, the first action can be suppressed and the second action can be initiated instead of the first action. In this case, the device can notify the user with a second notification such as a double vibration. Confirmations (vibrations or audible beeps) can be enabled or disabled for each NFC tag individually. After the NFC tag is registered with the user's device, the user can move the NFC tag and/or set it to perform other operations without the need to re-register the NFC tag with the device. In some embodiments, the users can also initiate actions directly on the application for all of their registered NFC tags.

The following describes some example scenarios of using NFC tags to cause implementations of certain predetermined actions by a device. In one example, an NFC tag can be added to a magnet to be placed on a refrigerator. When a user taps a device on the NFC tag, it causes a fitness tracking application or nutrition tracking application to add up a cup of water to a user's account. However, if the user holds the device near the NFC tag for a predetermined period, the device causes the opening of a food tracking form of the nutritional application instead of adding a cup of water. In another example, an NFC tag can be added to a pin to be placed on a shirt of a user such that when the user places his mobile device close to the NFC tag, it causes the opening of a favorite mobile game or another application.

In an alternative embodiment, when the NFC tag is placed on a couch, the device can open a remote control application if the device comes into close contact with the NFC tag. In yet additional example, a NFC tag can be glued to a clip. The clip can be attached to food packaging such as a snack box. When the user taps the mobile device over the NFC tag, the device can automatically record the number of snacks the user eats. If the NFC tag is placed inside a car, the application can automatically cause opening a garage door when the device comes into a close proximity of the NFC tag.

According to some embodiments, there can be some additional ways to interact with NFC tags, which can cause implementation of one or more actions upon detecting NFC tags by a device and upon identifying one of a plurality of qualifying events. The qualifying events can be as follows: a device taps a NFC tag (e.g., a brief touch of the NFC tag by the device), an orientation of the device (e.g., upside down), a state of the device (e.g., locked or unlocked), a period of holding the device close to the NFC tag, a geographical location of the device (e.g., it can be determined if the device is close to a predetermined location or item).

The following detailed description of embodiments includes references to the accompanying drawings, which form a part of the detailed description. Approaches described in this section are not prior art to the claims and are not admitted to be prior art by inclusion in this section. Reference throughout this specification to "one embodiment," "an embodiment," "some embodiments," "some implementations" or similar language means that a particular feature, structure, or characteristic described in connection with an example implementation is included in at least one embodiment of the present disclosure. Thus, appearances of the phrases "in one embodiment," "in an embodiment," "in some embodiments," and similar language throughout this specification may, but do not necessarily, all refer to the same embodiment.

Furthermore, the described features, structures, or characteristics of embodiments may be combined in any suitable manner in one or more implementations. In the following description, numerous specific details are provided, such as examples of programming, software modules, user selections, network transactions, hardware modules, hardware circuits, hardware chips, etc., to provide a thorough understanding of embodiments. One skilled in the relevant art will recognize, however, that the embodiments can be practiced without one or more of the specific details, or with other methods, components, materials, and so forth. In other instances, well-known structures, materials, or operations are not shown or described in detail to avoid obscuring aspects of the disclosure.

Aspects of the embodiments of this disclosure will now be presented with reference to accompanying drawings which show blocks, components, circuits, steps, operations, processes, algorithms, and the like, collectively referred to as "elements" for simplicity. These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. One or more processors in the processing system may execute software, firmware, or middleware (collectively referred to as "software"). The term "software" shall be construed broadly to mean processor-executable instructions, instruction sets, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise.

Accordingly, in one or more embodiments, the functions described herein may be implemented in hardware, software, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

The term "mobile device" shall be construed to mean any electronic device configured to process digital data and wirelessly communicate with one or more NFC tags using NFC or similar technology. By way of example, and not limitation, some examples of mobile devices include a user device, cellular phone, user equipment, terminal, mobile phone, smart phone, Internet phone, tablet computer, laptop computer, personal digital assistant, music player, multimedia player, gaming device, game console, and so forth.

The term "remote electronic device" shall be construed to mean any electronic device configured to implement one or more actions based on instructions or commands generated by a mobile device. By way of example, and not limitation, some examples of remote electronic devices include a computing device, navigation system, television (TV) device, set-top box, multimedia system, multimedia player, display, speaker, network device, modem, network router, network hub, home gateway, broadband gateway, network appliance, access gateway, networking switch, entertainment system, infotainment system, in-vehicle computer, home appliance (e.g., a dish washing machine, refrigerator, oven, etc.), "smart" appliance, electronically operated door, access control system, security system, programmable electrical socket, programmable electrical switch, dimmer, intercom, telephone, fax machine, server, web service, online service, electrical elements of "smart" home, Internet-of-Things devices, and the like.

The term "NFC tag" shall be construed to mean an electronic apparatus configured to actively or passively emit an electromagnetic signal bearing a unique identifier of NFC tag and, optionally, other information. Passive NFC tags are powered by and read at short ranges via magnetic fields so that they emit electromagnetic waves conveying certain information. In other words, the passive NFC tag, when powered, emits an electromagnetic signal. The passive NFC tag can be powered by electromagnetic field generated by a mobile device. Active NFC tags are powered by a local power source, such as a battery, and repeatedly emit an electromagnetic signal bearing a unique identifier of NFC tag and, optionally, other information. Some examples of NFC tags can include, but not limited to, RFID tags, RFID labels, transponders, Wi-Fi emitter tags, Bluetooth emitter tags, Wi-Fi beacons, Bluetooth beacons, and so forth.

Referring now to the drawings, example embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 shows a block diagram illustrating a system 100 for providing NFC-based interactions according to one example embodiment. System 100 includes a device 105, such as a smart phone, which can interact with one or more NFC tags 110. Each NFC tag 110 can include at least a chip 115, such as a microcontroller, microprocessor, circuit, logic, and the like. Each NFC tag 110 can also include a communication module 120 including, for example, an antenna or coil. The NFC tag 110 may also not include the communication module 120. If the NFC tag 110 does contain the communication module 120, the communication module 120 can be configured to receive a first electromagnetic signal originated from device 105 (e.g., a signal to power NFC tag 110 and request a response). Communication module 120 can be also configured to transmit or emit a second electromagnetic signal for further reception by device 105. The second electromagnetic signal can be generated as a response to the first electromagnetic signal. The second electromagnetic signal can include a unique identifier of NFC tag 110 and, optionally, other information such as predetermined commands, instructions, location information, and so forth. The elements of NFC tag 110, including chip 115 and communication module 120, can be arranged in a housing or substrate 125. Substrate 125 can be rigid or flexible. Each of NFC tags 110 can be also equipped with an adhesive layer 130 attached to an external side of housing or substrate 125. NFC tags 110 can be of any desired color and shape. For example, NFC tags 110 can be implemented as stickers or key fobs. NFC tags 110 can be placed, mounted, fixed, glued, attached, pinned, or otherwise connected to various items indoors or outdoors. For example, NFC tags 110 can be attached to apparel, furniture, vehicle, computer, building elements, and so forth.

Device 105 includes at least a NFC communication module 135, a processor 140, and a memory 145 for storing processor-executable instructions. Other elements of device 105 shall be evident from FIG. 3 and its respective description which follows. NFC communication module 135 is configured to communicate with NFC tag 110 for, at least, receiving the second electromagnetic signal. Communication between NFC communication module 135 and NFC tag 110 can be successful only when NFC tag 110 is within a predetermined distance from NFC communication module 135, such as, less than ten inches, preferably less than two inches. NFC communication module 135 can also generate the first electromagnetic signal and emit it for further receipt by NFC tags 110. Upon receipt of the second electromagnetic signal by device 105, the second electromagnetic signal can be processed by processor 140 to retrieve the unique identifier of NFC tag 110. Further, processor 140 can execute processor-executable instructions stored in memory 145 to cause implementation of one or more predetermined or preprogrammed actions associated with the unique identifier as a response to receipt of the second electromagnetic signal.

Processor 140 can also identify one or more identifying events, such as a period of presence of device 105 near a particular NFC tag 110, determination of a current geographical location of device 105, determination of a current orientation of device 105, determination of a current status of device 105 (e.g., if it is locked or unlocked), and so forth. The determination of geographical location of device 105 can be implemented with the help of a Global Positioning System (GPS) module or another common device for determining a geographical location, which can be installed in device 105. The determination of current orientation of device 105 can be determined with the help of inertial sensors, gyroscopes, or motion sensors, which can be installed in device 105. Determination of a period indicating how long device 105 is located near a particular NFC tag 110 can be executed with the help of a clock, which can be installed in device 105.

As indicated above, device 105 can execute one or more actions as response to detection of NFC tag 110 or detection of one of qualifying event. Some examples of these "actions" include, but not limited to, causation of changing a setting of the device, causation of switching an operating mode of the device, causation of activating/deactivating the application, causation of enabling/disabling a feature of the application, and the like. In some embodiments, an action can be a causation of sending a predetermined instruction to one or more remote electronic device 150. The instruction can be sent via a communications network 155. Communications network 155 can refer to any wired, wireless, or optical networks including, for example, the Internet, intranet, local area network (LAN), Personal Area Network (PAN), Wide Area Network (WAN), Virtual Private Network (VPN), cellular phone networks (e.g., packet switching communications network, circuit switching communications network), Bluetooth radio, Ethernet network, an IEEE 802.11-based radio frequency network, IP communications network, or any other data communication network utilizing physical layers, link layer capability, or network layer to carry data packets, or any combinations of the above-listed data networks.

Figure 2:
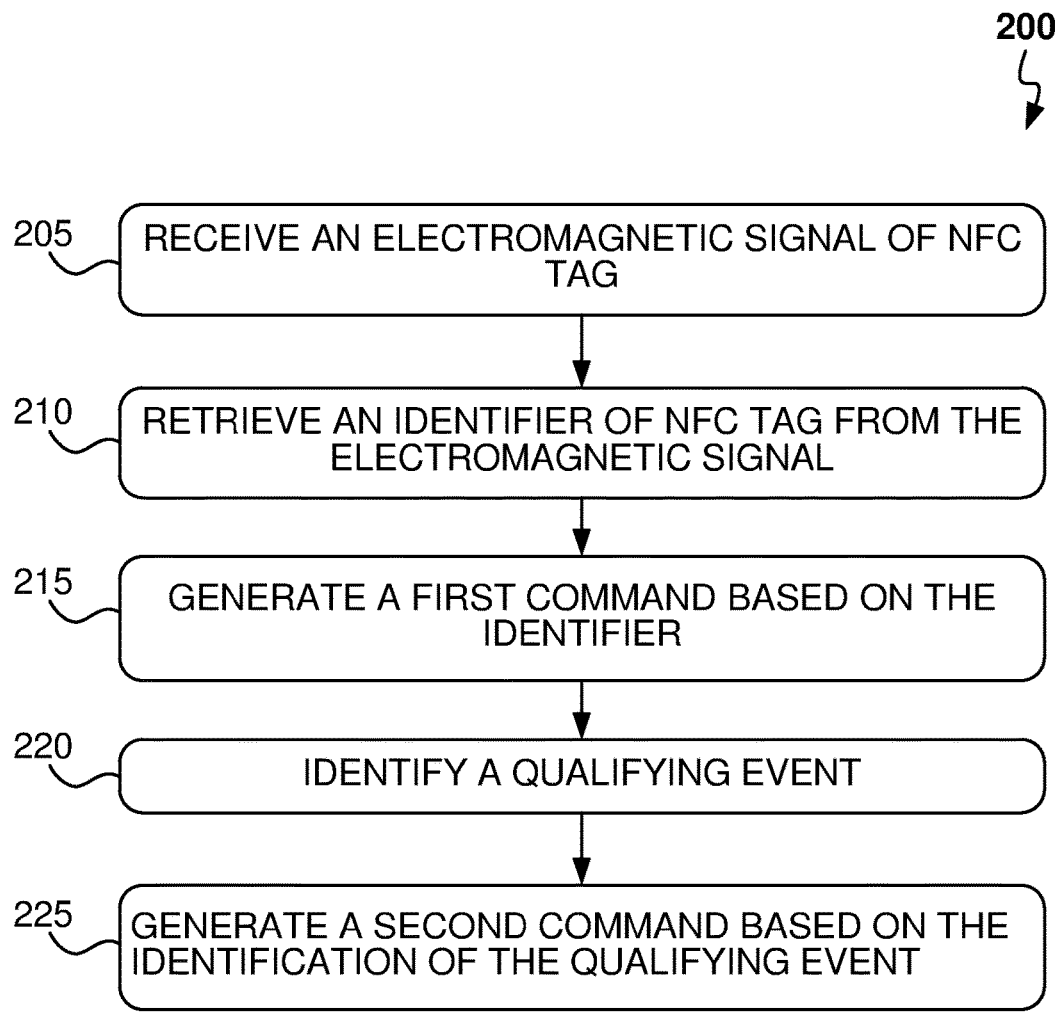
FIG. 2 is a process flow diagram showing a method for NFC-based interactions.

FIG. 2 is a process flow diagram showing a method 200 for NFC-based interaction according to an example embodiment. Method 200 may be performed by processing logic that may comprise hardware (e.g., decision-making logic, dedicated logic, programmable logic, application-specific integrated circuit (ASIC)), software (such as software run on a general-purpose computer system or a dedicated machine), or a combination of both. In one example embodiment, the processing logic refers to one or more elements of device 105 of FIG. 1. Below recited operations of method 200 may be implemented in an order different than described and shown in the figure. Moreover, method 200 may have additional operations not shown herein, but which can be evident for those skilled in the art from the present disclosure. Method 200 may also have fewer operations than outlined below and shown in FIG. 2.

At operation 205, device 105 receives an electromagnetic signal of NFC tag 110 when device 105 is within a first predetermined distance from the NFC tag (e.g., less than two inches). The electromagnetic signal of NFC tag 110 can be received in response to another electromagnetic signal generated by device 105.

At operation 210, device 105 retrieves an identifier of NFC tag 110 from the electromagnetic signal received at operation 205. The identifier can uniquely identify NFC tag 110. Device 105 can include one or more settings associated with the identifier of NFC tag 110.

At operation 215, device 105 generates a first command based on the identifier. The first command is configured to cause performing one or more of the following: change at least one setting of device 105, switch at least one of operating modes of device 105, activate at least one of the applications of device 105, deactivate at least one of the applications of device 105, enable at least one feature of at least one of the applications of device 105, disable at least one feature of at least one of the applications of device 105, and send a first instruction to at least one of remote electronic devices 150. Further, at operation 215, device 105 can generate a first notification (such as an audio alert, displayable message, or vibration alert) and deliver it to the user prior to or after the generation of first command.

At operation 220, device 105 identifies a qualifying event before or after the first command is generated. In some embodiments, the identification of the qualifying event can include determining, by device 105, that device 105 is located within the first predetermined distance from NFC tag 110 for a predetermined period (e.g., 1, 2, 3, 4, 5 or more seconds). In some embodiments, the identification of the qualifying event can include determining, by device 105, that device 105 is orientated substantially upside down such that a display of device 105 is substantially parallel to and faces the ground. In some embodiments, the identification of the qualifying event can include determining, by device 105, that device 105 is locked. In some embodiments, the identification of the qualifying event can include determining, by device 105, that device 105 unlocked. In some embodiments, the identification of the qualifying event can include determining, by device 105, that device 105 is located within a second predetermined distance (e.g., less than 5 feet) from a predetermined geographical location associated with the identifier of NFC tag 110. This predetermined geographical location associated with the identifier can be, for example, a garage door, piece of furniture, a particular room or office in a building, outdoor location, vehicle, and so forth.

At operation 225, device 105 generates a second command based on the identification of the qualifying event. In one embodiment, the second command is generated after the first command is generated. In another embodiment, the second command is generated and the first command is suppressed upon identification of the qualifying event. The second command can be configured to cause performing one or more of the following: change at least one setting of device 105, switch at least one of operating modes of device 105, activate at least one of the applications of device 105, deactivate at least one of the applications of device 105, enable at least one feature of at least one of the applications of device 105, disable at least one feature of at least one of the applications of device 105, authenticate the identity of an individual, enable at least one or more additional immersive interactions with the at least one application, and send a second instruction to at least one of remote electronic devices 150. Further, at operation 225, device 105 can generate a second notification (such as an audio alert, displayable message, or a double vibration notification) and deliver it to the user prior to or after the generation of second command.

Figure 3:
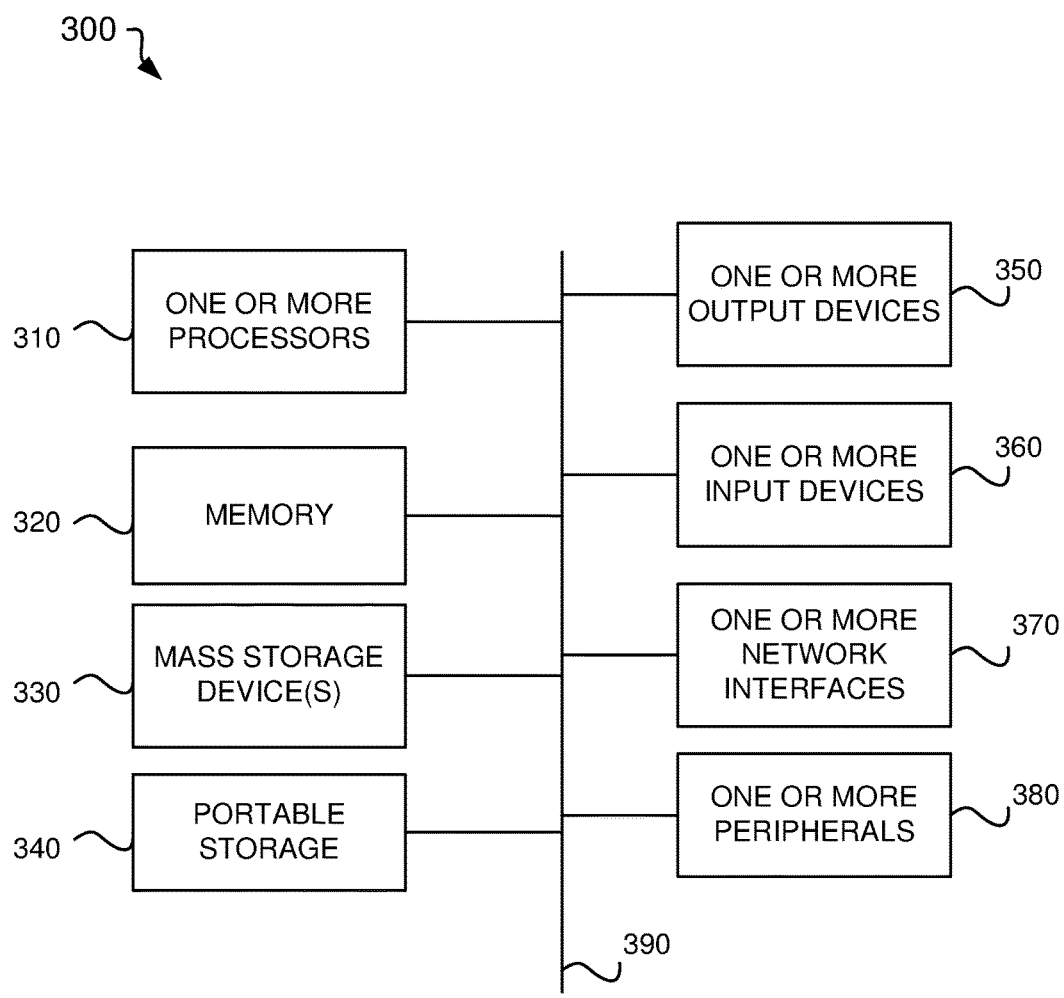
FIG. 3 shows an example computer system that can be used to implement at least some operations of a method for NFC-based interactions.

FIG. 3 is a high-level block diagram illustrating a computing device 300 suitable for implementing the methods described herein. In particular, computing device 300 may be used for implementing the methods for NFC-based interaction as described above. Computing device 300 may include, be, or be an integral part of one or more of a variety of types of devices, such as a mobile device, among others. In some embodiments, computing device 300 can be regarded as an instance of device 105.

As shown in FIG. 3, computing device 300 includes one or more processors 310, memory 320, one or more mass storage devices 330, one or more output devices 350, one or more input devices 360, one or more network interfaces 370, one or more optional peripheral devices 380, and a communication bus 390 for operatively interconnecting the above-listed elements. Processor(s) 310 can be configured to implement functionality and/or process instructions for execution within computing device 300. For example, processor(s) 310 may process instructions stored in memory 320 or instructions stored on mass storage devices 330. Such instructions may include components of an operating system or software applications.

Memory 320, according to one example, is configured to store information within computing device 300 during operation. For example, memory 320 can store settings or pre-programmed commands associated with one or more NFC tags 110. Memory 320, in some example embodiments, may refer to a non-transitory computer-readable storage medium or a computer-readable storage device. In some examples, memory 320 is a temporary memory, meaning that a primary purpose of memory 320 may not be long-term storage. Memory 320 may also refer to a volatile memory, meaning that memory 320 does not maintain stored contents when memory 320 is not receiving power. Examples of volatile memories include RAM, dynamic random access memories (DRAM), static random access memories (SRAM), and other forms of volatile memories known in the art. In some examples, memory 320 is used to store program instructions for execution by processor(s) 310. Memory 320, in one example, is used by software applications or mobile applications. Generally, software or mobile applications refer to software applications suitable for implementing at least some operations of the methods as described herein.

Mass storage devices 330 can also include one or more transitory or non-transitory computer-readable storage media or computer-readable storage devices. For example, memory 320 can store instructions for processor 310, settings or pre-programmed commands associated with one or more NFC tags 110. In some embodiments, mass storage devices 330 may be configured to store greater amounts of information than memory 320. Mass storage devices 330 may be also configured for long-term storage of information. In some examples, mass storage devices 330 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Computing device 300 may also include one or more optional input device(s) 360. Input device(s) 360 may be configured to receive input from a user through tactile, audio, video, or biometric channels. Examples of input devices 360 may include a keyboard, keypad, mouse, trackball, touchscreen, touchpad, microphone, video camera, image sensor, fingerprint sensor, or any other device capable of detecting an input from a user or other source, and relaying the input to computing device 300 or components thereof.

Optional output device(s) 350 may be configured to provide output to a user through visual or auditory channels. Output device(s) 350 may include a video graphics adapter card, display, such as liquid crystal display (LCD) monitor, light emitting diode (LED) monitor, or organic LED monitor, sound card, speaker, lighting device, projector, or any other device capable of generating output that may be intelligible to a user. Output device(s) 350 may also include a touchscreen, presence-sensitive display, or other input/output capable displays known in the art.

Computing device 300 can also include network interface(s) 370. Network interface(s) 370 can be utilized to communicate with external devices via one or more communications networks such as communications network 155 or any other wired, wireless, or optical networks. Network interface(s) 370 may be a network interface card, such as an Ethernet card, an optical transceiver, a radio frequency transceiver, or any other type of device that can send and receive information. Network interface(s) 370 can also include a NFC communication module 135 for communicating, sensing, or receiving data from NFC tags 110.

An operating system of computing device 300 may control one or more functionalities of computing device 300 or components thereof. For example, the operating system may interact with the software or mobile applications and may facilitate one or more interactions between the software/mobile applications and processor(s) 310, memory 320, mass storage devices 330, input device(s) 360, output device(s) 350, and network interface(s) 370. The operating system may interact with or be otherwise coupled to software applications or components thereof. In some embodiments, software or mobile applications may be included in the operating system.

Thus, methods and systems for NFC-based interactions have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for Near Field Communication (NFC) based interaction, the method comprising:
    receiving, by a device, an electromagnetic signal of an NFC tag;
    retrieving, by the device, an identifier of the NFC tag from the electromagnetic signal of the NFC tag;
    based on the identifier, generating, by the device, a first command, wherein the first command is configured to cause performing one or more of the following: change at least one setting of the device, switch at least one of operating modes of the device, activate at least one of applications, deactivate at least one of the applications, enable at least one feature of at least one of the applications, disable at least one feature of at least one of the applications, and send a first instruction to at least one of remote electronic devices;
    identifying, by the device, a qualifying event, the qualifying event being:
    the device being located within a first predetermined distance from the NFC tag for a predetermined period, the device being orientated substantially upside down, the device being locked, the device being unlocked, or the device being located within a second predetermined distance from a predetermined geographical location associated with the identifier of the NFC tag; and
    based on the identification of the qualifying event, generating, by the device, a second command, wherein the first command is suppressed based on the identification of the qualifying event, and wherein the second command is configured to cause performing one or more of the following: change at least one of the settings of the device, activate at least one of the applications, deactivate at least one of the applications, enable at least one feature of at least one of the applications, disable at least one feature of at least one of the applications, and send a second instruction to at least one of the remote electronic devices.

2. The method of claim 1, wherein the first command and the second command are configured by the user prior to receiving the electromagnetic signal of the NFC tag.

3. The method of claim 1, wherein the identifying of the qualifying event includes determining, by the device, that the device is located within the first predetermined distance from the NFC tag for the predetermined period.

4. The method of claim 1, wherein the identifying of the qualifying event includes determining, by the device, that the device is orientated substantially upside down such that a display of the device is substantially parallel to a ground and faces the ground.

5. The method of claim 1, wherein the identifying of the qualifying event includes determining, by the device, that the device is locked.

6. The method of claim 1, wherein the identifying of the qualifying event includes determining, by the device, that the device is unlocked.

7. The method of claim 1, wherein the identifying of the qualifying event includes determining, by the device, that the device is located within the second predetermined distance from the predetermined geographical location associated with the identifier of the NFC tag.

8. The method of claim 1, further comprising providing, by the device, a first notification to a user when the first command is generated or is to be generated by the device.

9. The method of claim 8, further comprising providing, by the device, a second notification to the user when the second command is generated or is to be generated by the device.

10. The method of claim 9, wherein the first notification is a single vibrational notification generated by the device, and the second notification is a doubled vibrational notification generated by the device.

11. A device, comprising:
an NFC communication module configured to wirelessly communicate with one or more NFC tags;
a processor; and
a memory storing processor-executable codes, wherein the processor is configured to implement the following operations upon executing the processor-executable codes stored by the memory:
cause reading an electromagnetic signal of one of the NFC tags;
cause retrieving an identifier of the one of the NFC tags from the electromagnetic signal;
based on the identifier, cause generating a first command, wherein the first command is configured to cause performing one or more of the following: change at least one setting of the device, switch at least one of operating modes of the device, activate at least one of applications, deactivate at least one of the applications, enable at least one feature of at least one of the applications, disable at least one feature of at least one of the applications, and send a first instruction to at least one of remote electronic devices;
cause identifying a qualifying event, the qualifying event being:
the device being located within a first predetermined distance from the one of the NFC tags for a predetermined period, the device being orientated substantially upside down, the device being locked, the device being unlocked, or the device being located within a second predetermined distance from a predetermined geographical location associated with the identifier of the one of the NFC tags; and
based on the identification of the qualifying event, cause generating a second command, wherein the first command is suppressed based on the identification of the qualifying event, and wherein the second command is configured to cause performing one or more of the following: change at least one of the settings of the device, deactivate at least one of the applications, enable at least one feature of at least one of the applications, disable at least one feature of at least one of the applications, and send a second instruction to at least one of the remote electronic devices.

12. The device of claim 11, wherein the qualifying event is identified when it is determined that the device is located within the first predetermined distance from the one of the NFC tags for the predetermined period.

13. The device of claim 11, wherein the qualifying event is identified when it is determined that the device is orientated substantially upside down such that a display of the device is substantially parallel to a ground and faces the ground.

14. The device of claim 11, wherein the qualifying event is identified when it is determined that the device is locked.

15. The device of claim 11, wherein the qualifying event is identified when it is determined that the device is unlocked.

16. The device of claim 11, wherein the qualifying event is identified when it is determined that the device is located within the second predetermined distance from the predetermined geographical location associated with the identifier of the one of the NFC tags.

17. The device of claim 11, wherein the processor is further configured to implement the following operations upon executing the processor-executable codes stored by the memory: cause providing a first notification to a user when the first command is generated or is to be generated by the device.

18. The device of claim 17, wherein the processor is further configured to implement the following operations upon executing the processor-executable codes stored by the memory: cause providing a second notification to the user when the second command is generated or is to be generated by the device.

19. The device of claim 18, wherein the first notification is a single vibrational notification generated by the device, and the second notification is a doubled vibrational notification generated by the device.

20. A non-transitory processor-readable medium having instructions stored thereon, which when executed by one or more processors, cause the one or more processors to implement a method for NFC based interaction, the method comprising:
receiving, by a device, an electromagnetic signal of an NFC tag;
retrieving, by the device, an identifier of the NFC tag from the electromagnetic signal of the NFC tag;
based on the identifier, generating, by the device, a first command, wherein the first command is configured to cause performing one or more of the following: change at least one setting of the device, switch at least one of operating modes of the device, activate at least one of applications, deactivate at least one of the applications, enable at least one feature of at least one of the applications, disable at least one feature of at least one of the applications, and send a first instruction to at least one of remote electronic devices;
identifying, by the device, a qualifying event, the qualifying event being:
the being device located within a first predetermined distance from the NFC tag for a predetermined period, the device being orientated substantially upside down, the device being locked, the device being unlocked, or the device being located within a second predetermined distance from a predetermined geographical location associated with the identifier of the NFC tag; and
based on the identification of the qualifying event, generating, by the device, a second command, wherein the first command is suppressed based on the identification of the qualifying event, and wherein the second command is configured to cause performing one or more of the following: change at least one of the settings of the device, activate at least one of the applications, deactivate at least one of the applications, enable at least one feature of at least one of the applications, disable at least one feature of at least one of the applications, and send a second instruction to at least one of the remote electronic devices.

* * * * *